United States Patent
Zhang et al.

(10) Patent No.: US 10,769,484 B2
(45) Date of Patent: Sep. 8, 2020

(54) CHARACTER DETECTION METHOD AND APPARATUS

(71) Applicant: Baidu Online Network Technology (Beijing) Co., Ltd., Beijing (CN)

(72) Inventors: Chengquan Zhang, Beijing (CN); Han Hu, Beijing (CN); Yuxuan Luo, Beijing (CN); Junyu Han, Beijing (CN); Errui Ding, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 42 days.

(21) Appl. No.: 15/419,958

(22) Filed: Jan. 30, 2017

(65) Prior Publication Data
US 2018/0189604 A1    Jul. 5, 2018

(30) Foreign Application Priority Data
Dec. 30, 2016   (CN) .......................... 2016 1 1262299

(51) Int. Cl.
*G06K 9/46* (2006.01)
*G06N 3/04* (2006.01)
(Continued)

(52) U.S. Cl.
CPC ........... *G06K 9/4628* (2013.01); *G06K 9/342* (2013.01); *G06K 9/344* (2013.01); *G06K 9/469* (2013.01);
(Continued)

(58) Field of Classification Search
None
See application file for complete search history.

(56) References Cited

U.S. PATENT DOCUMENTS 9,524,440 B2 * 12/2016 Wimmer ............ G06K 9/00865
9,536,522 B1 *  1/2017 Hall .................... G10L 15/18
(Continued)

FOREIGN PATENT DOCUMENTS

CN          105678293 A       6/2016

OTHER PUBLICATIONS

T. Wang, D. J. Wu, A. Coates and A. Y. Ng, "End-to-end text recognition with convolutional neural networks," Proceedings of the 21st International Conference on Pattern Recognition (ICPR2012), Tsukuba, 2012, pp. 3304-3308.*

(Continued)

*Primary Examiner* — Jiangeng Sun
(74) *Attorney, Agent, or Firm* — Knobbe, Martens, Olson & Bear, LLP

(57) ABSTRACT

Disclosed embodiments relate to a character detection method and apparatus. In some embodiments, the method includes: using an image including an annotated word as an input to a machine learning model; selecting, based on a predicted result of characters inside an annotation region of the annotated word predicted and annotation information of the annotated word, characters for training the machine learning model from the characters inside the annotation region of the annotated word predicted; and training the machine learning model based on features of the selected characters. This implementation manner implements the full training of a machine learning model by using existing word level annotated images, to obtain a machine learning model capable of detecting characters in images, thereby reducing the costs for the training of a machine learning model capable of detecting characters in images.

13 Claims, 5 Drawing Sheets

(51) Int. Cl.
    *G06K 9/34*    (2006.01)
    *G06K 9/62*    (2006.01)
(52) U.S. Cl.
    CPC ......... *G06K 9/6262* (2013.01); *G06K 9/6274* (2013.01); *G06N 3/0454* (2013.01); *G06K 2209/01* (2013.01)

(56) References Cited

U.S. PATENT DOCUMENTS

| | | | | |
|---|---|---|---|---|
| 2005/0259866 | A1* | 11/2005 | Jacobs | G06K 9/00463 |
| | | | | 382/157 |
| 2013/0226935 | A1* | 8/2013 | Bai | G06F 17/3064 |
| | | | | 707/748 |
| 2015/0347861 | A1* | 12/2015 | Doepke | H04N 5/23245 |
| | | | | 382/199 |
| 2015/0371100 | A1* | 12/2015 | Wshah | G06T 7/0079 |
| | | | | 382/182 |
| 2016/0329044 | A1* | 11/2016 | Cao | G10L 15/063 |
| 2017/0098138 | A1* | 4/2017 | Wang | G06K 9/6257 |
| 2017/0098141 | A1* | 4/2017 | Wang | G06K 9/6828 |
| 2017/0124435 | A1* | 5/2017 | Wustlich | G06F 17/2705 |
| 2017/0132526 | A1* | 5/2017 | Cohen | G06N 99/005 |
| 2017/0200065 | A1* | 7/2017 | Wang | G06F 17/3028 |
| 2017/0200066 | A1* | 7/2017 | Wang | G06F 17/30253 |
| 2017/0286803 | A1* | 10/2017 | Singh | G06K 9/6212 |
| 2017/0308790 | A1* | 10/2017 | Nogueira dos Santos | |
| | | | | G06N 99/005 |
| 2017/0317983 | A1* | 11/2017 | Kompalli | G06K 9/00442 |
| 2018/0005082 | A1* | 1/2018 | Bluche | G06K 9/6256 |
| 2018/0025256 | A1* | 1/2018 | Bai | G06K 9/6277 |
| 2018/0101750 | A1* | 4/2018 | Soldevila | G06K 9/4671 |

OTHER PUBLICATIONS

Max Jaderberg, Deep Learning for Text Spotting, D. Phil Thesis, University of Oxford, 2014).*

T. He, W. Huang, Y. Qiao and J. Yao, "Text-Attentional Convolutional Neural Network for Scene Text Detection," in IEEE Transactions on Image Processing, vol. 25, No. 6, pp. 2529-2541, Jun. 2016. doi: 10.1109/TIP.2016.2547588.*

Gordo, Albert. "Supervised mid-level features for word image representation." 2015 IEEE Conference on Computer Vision and Pattern Recognition (CVPR) (2015): 2956-2964.*

Chengquan Zhang et al., "Automatic Discrimination Of Text And Non Text Natural Images," Document Analysis and Recognition (ICDAR), 2015 13th International Conference, pp. 886-890.

Xue Zhi-dong, Wang Yan, Sui Wei-ping. SVM-based segmentation method with filtration of training samples. Computer Engineering and Applications, 2007, 43(10), pp. 55-57.

* cited by examiner

CHARACTER DETECTION METHOD AND APPARATUS

CROSS-REFERENCE TO RELATED APPLICATIONS

This application claims the benefit of Chinese Patent Application No. 201611262299.3, entitled "Character Detection Method and Apparatus," filed on Dec. 30, 2016, which is incorporated hereby by reference in its entirety.

TECHNICAL FIELD

The present disclosure relates to the field of artificial intelligence, specifically to the field of machine learning, and more specifically to a character detection method and apparatus.

BACKGROUND

Machine learning has been widely applied to the technical fields of big data, image recognition, voice recognition, and so on. However, as regards the detection of characters in images, because currently existing annotation samples are generally word level annotation samples and cannot participate in the training of a machine learning model for character detection, the machine learning model for character detection cannot be fully trained, and consequently characters in images cannot be precisely detected. In addition, only samples that satisfy strict annotation requirements can participate in training, further reducing the number of annotation samples that can participate training.

SUMMARY

The present disclosure provides a character detection method and apparatus, so as to solve the technical problems mentioned in the Background section.

According to a first aspect, the some embodiments of the present disclosure provide a character detection method, comprising: using an image including an annotated word as an input to a machine learning model; selecting, based on a predicted result of characters inside an annotation region of the annotated word predicted by the machine learning model and annotation information of the annotated word, characters for training the machine learning model from the characters inside the annotation region of the annotated word predicted by the machine learning model; and training the machine learning model based on features of the selected characters, and detecting characters in an image by using the trained the machine learning model.

According to a second aspect, some embodiments of the present disclosure provide a character detection apparatus, comprising: an input unit, configured to use an image including an annotated word as an input to a machine learning model; a selection unit, configured to select, based on a predicted result of characters inside an annotation region of the annotated word predicted by the machine learning model and annotation information of the annotated word, characters for training the machine learning model from the characters inside the annotation region of the annotated word predicted by the machine learning model; and a training unit, configured to train the machine learning model based on features of the selected characters, and detect characters in an image by using the trained the machine learning model.

According to the character detection method and apparatus provided by some embodiments of the present disclosure, an image including an annotated word is used as an input to a machine learning model; based on a predicted result of characters inside an annotation region of the annotated word predicted by the machine learning model and annotation information of the annotated word, characters for training the machine learning model are selected from the characters inside the annotation region of the annotated word predicted by the machine learning model; and the machine learning model is trained based on features of the selected characters. The present disclosure implements the full training of a machine learning model by using existing word level annotated images, to obtain a machine learning model capable of detecting characters in images, thereby reducing the costs for the training of a machine learning model capable of detecting characters in images.

BRIEF DESCRIPTION OF THE DRAWINGS

Other features, purposes and advantages of the present disclosure will become more apparent from a reading of the detailed description of the non-limiting embodiments, said description being given in relation to the accompanying drawings, among which.

DETAILED DESCRIPTION OF EMBODIMENTS

The present disclosure will be described in details below in conjunction with the accompanying drawings and embodiments. It should be appreciated that some embodiments described herein are merely provided to illustrate the present disclosure, but not to limit the present disclosure. In addition, it should also be noted that only the related parts of the present disclosure are shown in the accompanying drawings for the ease of description.

It should be noted that the embodiments and features of the embodiments in the present disclosure, on a non-conflicting basis, may be combined. The present disclosure will be discussed in details below with reference to the accompanying drawings.

Figure 1:
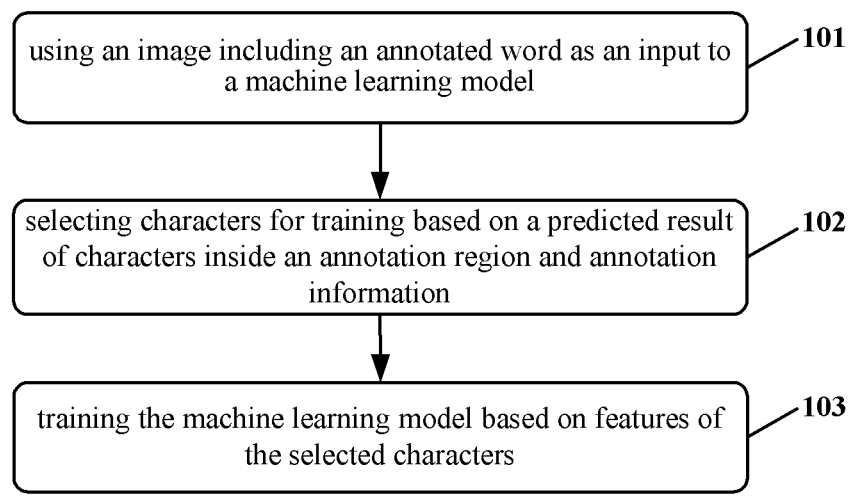
FIG. 1 is a flow chart of a character detection method according to some embodiments of the present disclosure.

Referring to FIG. 1, FIG. 1 is a flow chart of a character detection method according to some embodiments of the present disclosure. The method includes the following steps:

Step 101, using an image including an annotated word as an input to a machine learning model.

In some embodiments, the image including the annotated word may include an object for annotating the position of the word.

For example, the image includes an annotation box surrounding the word, for annotating the position of the word in the image. The word in the image that is inside the annotation box may be referred to as the annotated word, the image including the annotated word may be referred to as a word level annotated image, and the annotation box may be referred to as annotation information of the annotated word.

In some embodiments, the word level annotated image may be used as an input to the machine learning model. When the probability of existence of a character at a position in the image is greater than a threshold, the machine learning model may predict that a character may exist at the position, and an object at the position may be referred to a predicted character. The machine learning model may output a predicted result of the predicted character.

In some optional implementations of some embodiments, the machine learning model is a convolutional neural network.

In some embodiments, the machine learning model may be a convolutional neural network. The convolutional neural network may include, but not limited to, a deep convolutional network, single shot multibox detector (SSD), Object Detection via Region-based Fully Convolutional Networks (R-FCN), Faster RCNN, or other deep convolutional network frameworks for generic object prediction.

In some optional implementations of some embodiments, the predicted result of the characters predicted by the machine learning model includes: confidence levels corresponding to the characters and bounding boxes corresponding to the characters, and the annotation information of the annotated word includes: a bounding box corresponding to the annotated word.

It will be appreciated that in some embodiments, the bounding box does not specifically refer to a particular object, and an object surrounding a to-be-detected object in the image, which is used by the machine learning model for predicting the to-be-detected object, may be referred to as the bounding box. Correspondingly, the bounding box may correspond to one confidence level.

In an example where the machine learning model is a convolutional neural network SSD, when a word level annotated image is used as an input to the SSD, that is, after the word level annotated image is input to the SSD, the SSD may output a predicted result of a predicted character. The predicted result of the predicted character may include: a bounding box corresponding to the character and a confidence level (text/non-text score) corresponding to the character. The confidence level corresponding to the character may be used for representing the probability that an object in the bounding box is a character.

In some optional implementations of some embodiments, the method further includes: using a word level annotated image in a word level annotated dataset as the image including the annotated word, where the word level annotated image includes: an annotation box surrounding the word, for annotating the position of the word.

For example, a word level annotated dataset, COCO-Text dataset, includes a word level annotated image. The word level annotated image includes: an annotation box surrounding a word, for annotating the position of the word; and an annotated word inside the annotation box. The word level annotated image in the COCO-Text dataset may be used as an input to the machine learning model.

Step 102, selecting characters for training based on a predicted result of characters inside an annotation region and annotation information.

In some embodiments, to train the machine learning model by using the word level annotated image so as to obtain a machine learning model for detecting characters in images, first, characters inside the annotation region of the annotated word may be found from the characters predicted by the machine learning model. Then, characters suitable for participating in the training of the machine learning model may be selected from the predicted characters inside the annotation region of the annotated word, based on the predicted result of the predicted characters inside the annotation region of the annotated word and the annotation information of the annotated word.

In an example where the machine learning model is a convolutional neural network SSD and the word level annotated image includes an annotation box, the annotation information of the annotated word is the annotation box. The annotation region of the annotated word is a region occupied by the annotation box. The annotation box may be of any shape such as a polygon, and is used for surrounding a word in the image and annotating the position of the word. The annotation box may also be referred to as a bounding box corresponding to the annotated word. After the image including the annotated word is used as an input to the SSD, the SSD may output a predicted result of a predicted character. The predicted result of the character predicted by the SSD may include: a bounding box corresponding to the character and a confidence level corresponding to the character. The confidence level corresponding to the character may be used for representing the probability that an object in the bounding box is a character. First, characters inside the annotation box may be found from the characters predicted by the SSD. For example, when a bounding box corresponding to a predicted character is located in the bounding box corresponding to the annotated word, it may be determined that the position of the detected character is located inside the annotation box. Then, characters suitable for participating in the training of the SSD may be selected from the characters inside the annotation box predicted by the SSD, based on the predicted result of the characters inside the annotation box predicted by the SSD and the bounding box corresponding to the annotated word.

In some optional implementations of some embodiments, the selecting characters for training the machine learning model from the characters inside the annotation region of the annotated word predicted by the machine learning model includes: selecting the characters for training the machine learning model from the characters inside the annotation region of the annotated word predicted by the machine learning model, based on a proportional relationship between a region of the bounding boxes corresponding to the characters inside the annotation region of the annotated word predicted by the machine learning model and a region of the bounding box corresponding to the annotated word and an alignment between the characters inside the annotation region of the annotated word predicted by the machine learning model.

In an example where the machine learning model is a convolutional neural network SSD and the word level annotated image includes an annotation box, the annotation information of the annotated word is the annotation box. The annotation region of the annotated word is a region occupied by the annotation box. The annotation box may be of any shape such as a polygon, and is used for surrounding a word in the image and annotating the position of the word. The annotation box may also be referred to as a bounding box corresponding to the annotated word.

The predicted result of the characters inside the annotation box that are predicted by the SSD may include: bounding boxes corresponding to the characters and confidence levels corresponding to the characters. When the characters for training the SSD are selected from the characters inside the annotation box that are predicted by the SSD, the characters for participating in the training of the SSD may be selected based on a proportional relationship between a region of the bounding boxes corresponding to the characters inside the annotation box that are predicted by the SSD and a region of the bounding box corresponding to the annotated word and an alignment between the characters inside the annotation box that are predicted by the SSD. The selected characters should satisfy: the area of the corresponding bounding box covers as much as possible the area of the bounding box corresponding to the annotated word and the corresponding bounding box is as collinear as possible with the bounding box corresponding to the annotated word.

Step 103, training the machine learning model based on features of the selected characters.

In some embodiments, after the characters for training the machine learning model are selected from the characters inside the annotation region of the annotated word that are predicted by the machine learning model in step 102, the machine learning model may be trained by using the features of the characters selected for training the machine learning model.

For example, the characters selected from the predicted characters inside the annotation box in step 102 satisfy: the corresponding bounding box covers as much as possible the area of the bounding box corresponding to the annotated word and the corresponding bounding box is as collinear as possible with the bounding box corresponding to the annotated word. the machine learning model may be trained by using the features of the characters selected from the characters inside the annotation box, for example, by using the bounding boxes corresponding to the characters selected from the characters inside the annotation box.

In some embodiments, step 101 to step 103 may be performed multiple times to train the machine learning model multiple times, so as to obtain a machine learning model for detecting characters in images. In each training process, by performing step 101, an image including an annotated word, that is, a word level annotated image, is used as an input to a machine learning model. For example, a word level annotated image in a COCO-Text dataset is used as an input to the machine learning model. By performing step 102, based on a predicted result of characters inside an annotation region of an annotated word that are predicted by the machine learning model and annotation information of the annotated word, characters suitable for participating in the training of the machine learning model are selected from the predicted characters inside the annotation region of the annotated word. By performing step 103, the machine learning model is trained by using features of the characters selected for training the machine learning model.

In some embodiments, the method for training a machine learning model as described in step 101 to step 103 may be applied to a deep convolutional network, SSD, R-FCN, Faster RCNN, or other deep convolutional network frameworks for generic object prediction. Whereby, a machine learning model can be fully trained by using existing word level annotated images, for example, word level annotated images in a COCO-Text dataset, to obtain a machine learning model capable of detecting characters in images, thereby reducing the costs for the training of a machine learning model capable of detecting characters in images. The method is applicable to various different machine learning models. In addition, because the word level annotated images can be used for training without being limited by strict annotation requirements, the number of word level annotated images participating in training is increased, so that the machine learning model can be further fully trained.

Figure 2:
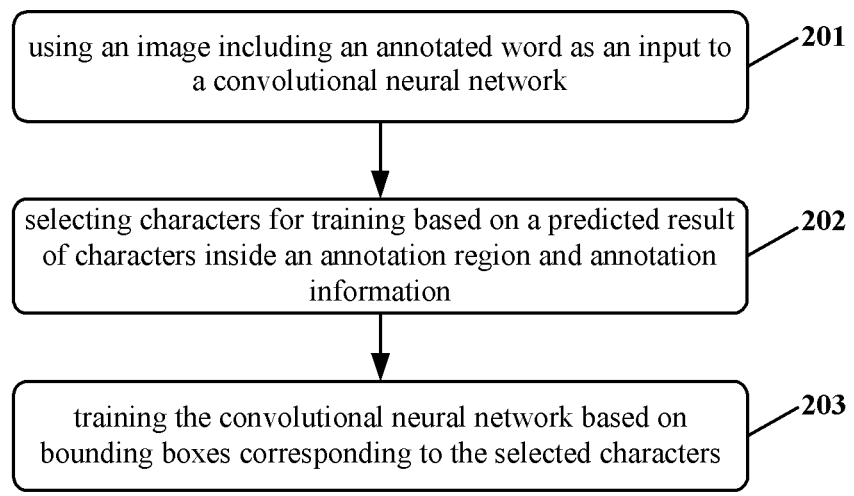
FIG. 2 is a flow chart of a character detection method according to some embodiments of the present disclosure.

Referring to FIG. 2, FIG. 2 is a flow chart of a character detection method according to some embodiments of the present disclosure. The method includes the following steps:

Step 201, using an image including an annotated word as an input to a convolutional neural network.

In some embodiments, the image including the annotated word includes an object for annotating the position of the word.

For example, the image includes an annotation box surrounding the word in the image, for annotating the position of the word in the image. The word in the image that is inside the annotation box may be referred to as the annotated word, the image including the annotated word may be referred to as a word level annotated image, and the annotation box may be referred to as annotation information of the annotated word.

In some embodiments, a word level annotated image in a word level annotated dataset may be used as an input to the convolutional neural network. For example, a word level annotated dataset, COCO-Text dataset, includes a word level annotated image. The word level annotated image includes: an annotation box surrounding a word, for annotating the position of the word; and an annotated word inside the annotation box. The word level annotated image in the COCO-Text dataset may be used as an input to the convolutional neural network.

In some embodiments, the convolutional neural network may include, but not limited to, a deep convolutional network, single shot multibox detector (SSD), Object Detection via Region-based Fully Convolutional Networks (R-FCN), Faster RCNN, or other deep convolutional network frameworks for generic object prediction. After the word level annotated image is used as the input to the convolutional neural network, the convolutional neural network is propagated forward, and the convolutional neural network may output a predicted result of a predicted character. The predicted result of the character predicted by the convolutional neural network may include: a bounding box corresponding to the character and a confidence level corresponding to the character. The confidence level corresponding to the character may be used for representing the probability that an object in the bounding box is a character.

It will be appreciated that in some embodiments, the bounding box does not specifically refer to a particular object, and an object surrounding a to-be-detected object in the image, which is used by the machine learning model for predicting the to-be-detected object, may be referred to as the bounding box. Correspondingly, the bounding box may correspond to one confidence level.

Step 202, selecting characters for training based on a predicted result of characters inside an annotation region and annotation information.

In some embodiments, to train the convolutional neural network by using the word level annotated image so as to obtain a convolutional neural network for detecting characters, first, characters inside the annotation region of the annotated word may be found from the characters predicted by the convolutional neural network. Then, characters suitable for participating in the training of the convolutional neural network may be selected from the predicted characters inside the annotation region of the annotated word, based on the predicted result of the characters inside the annotation region of the annotated word that are predicted by the convolutional neural network and the annotation information of the annotated word.

In an example where the convolutional neural network is an SSD and the word level annotated image includes an annotation box, the annotation information of the annotated word is the annotation box. The annotation region of the annotated word is a region occupied by the annotation box. The annotation box may be of any shape such as a polygon, and is used for surrounding a word in the image and annotating the position of the word. The annotation box may also be referred to as a bounding box corresponding to the annotated word.

After the word level annotated image is used as an input to the SSD, the predicted result of the characters inside the annotation box that are predicted by the SSD may include: bounding boxes corresponding to the characters and confidence levels corresponding to the characters. First, characters inside the annotation box may be found from the predicted characters. For example, when a bounding box corresponding to a predicted character is located in the bounding box corresponding to the annotated word, it may be determined that the position of the detected character is located inside the annotation box. Then, the characters suitable for participating in the training of the SSD may be selected based on a proportional relationship between the area of the bounding box corresponding to the predicted characters inside the annotation box and the area of the bounding box corresponding to the annotated word and an alignment between the predicted characters inside the annotation box. The selected characters should satisfy: the area of the corresponding bounding box covers as much as possible the area of the bounding box corresponding to the annotated word and the corresponding bounding box is as collinear as possible with the bounding box corresponding to the annotated word.

In some embodiments, the characters suitable for participating in the training of the convolutional neural network may be selected from the predicted characters inside the annotation region of the annotated word in the following manner: calculating, by using a K-NN (k-nearest neighbors) algorithm, k neighbors for the bounding boxes corresponding to the characters inside the annotation region of the annotated word that are predicted by the convolutional neural network, to obtain a topology structure that represents a connection relationship between the predicted characters inside the annotation region of the annotated word.

For example, k neighbors are calculated by using the K-NN algorithm according to the position of the central point of the bounding box corresponding to each character in the annotation region of the annotated word, to obtain a topology structure that represents a connection relationship between the characters inside the annotation region of the annotated word. In the topology structure, one character may be connected to k other characters inside the annotation region of the annotated word that are predicted by the convolutional neural network. There may be a weight $w_{ij}$ between two connected characters. The weight $w_{ij}$ may be calculated by using the following formula:

$$w_{ij} = \exp\left(-\frac{d(i,j)}{\bar{d}}\right) \cdot (t_i + t_j)$$

where $d(i, j)$ represents a distance between the two connected characters, $\bar{d}$ represents an average distance between characters in all the character connection pairs, and $t_i$ and $t_j$ represent respective confidence levels corresponding to the two connected characters. The distance between the two connected characters may be the distance between the positions of the center points of the bounding boxes corresponding to the two connected characters.

In the topology structure, two connected characters may constitute a character connection pair. After the distance between the two connected characters in each character connection pair is calculated, for example, after the distance between the positions of the center points of the bounding boxes corresponding to the two connected characters in each character connection pair is calculated, an average value of the distances between the two connected characters in each character connection pair may be calculated, to obtain the above-mentioned average distance between characters in all character connection pairs.

After k neighbors are calculated for the bounding boxes corresponding to the characters inside the annotation region of the annotated word that are predicted by the convolutional neural network, to obtain a topology structure that represents a connection relationship between the characters, a maximum spanning tree may be found from the topology structure. The maximum spanning tree includes all the characters inside the annotation region of the annotated word that are predicted by the convolutional neural network. All the characters inside the annotation region of the annotated word that are predicted by the convolutional neural network are sequentially connected in the maximum spanning tree. The sum of the weights between the characters connected in pairs among the sequentially connected characters is the greatest.

After the maximum spanning tree is found, a tree with the highest score among the maximum spanning tree and subtrees in the maximum spanning tree may be found. Characters in the tree with a high score are used as characters for participating the training of the convolutional neural network. In this way, the area of the bounding boxes corresponding to the characters participating in the training of the convolutional neural network covers as much as possible the area corresponding to the word level annotation information, and the characters participating in the training of the convolutional neural network are as collinear as possible.

A score s of the maximum spanning tree or a subtree in the maximum spanning tree may be calculated by using the following score calculation formula:

$$s = w \cdot s1 + (1-w) \cdot s2$$

$$s1 = \frac{\text{area}(B_{chars})}{\text{area}(B_{anno})}$$

$$s2 = 1 - \frac{\lambda_2}{\lambda_1}$$

$B_{chars}$ represents a bounding box corresponding to a character in the subtree or the current tree. When there are multiple characters in the subtree or the current tree, $B_{chars}$ may represent a bounding box collection comprising of the bounding box corresponding to each character.

$B_{anno}$ represents the bounding box corresponding to the annotated word. area($B_{chars}$) represents the area of the bounding boxes corresponding to the characters in the subtree or the current tree. When there are multiple characters in the subtree, area($B_{chars}$) may represent the sum of the area of the bounding box corresponding to each character. area($B_{anno}$) represents the area of the bounding box corresponding to the annotated word. $\lambda_1$ and $\lambda_2$ respectively represent the greatest feature value and the second greatest feature value of a covariance matrix C of the center coordinates of $B_{chars}$.

s1 may be used for describing a proportional relationship between a region of the bounding boxes corresponding to the characters inside the annotation region of the annotated word that are predicted by the machine learning model and a region of the bounding box corresponding to the annotated word. s2 may be used for describing alignment between the characters inside the annotation region of the annotated word that are predicted by the machine learning model.

The tree with the highest score among the maximum spanning tree and the subtrees in the maximum spanning tree may be found in the following manner: When the score is calculated for the first time, the maximum spanning tree is used as the current tree, and the score of the current tree is calculated by using the above-mentioned score calculation formula. The value of w is a preset weight. For example, the value of w is 0.5, and the score of the current tree is obtained. Meanwhile, each character connection pair in the current tree may be pruned. After each pruning, one character in the character connection pair may form one subtree with a character at upstream of the character, and the other character in the character connection pair may form one subtree with a character at downstream of the other character. After each character connection pair in the current tree is pruned, multiple subtrees may be obtained. The score of each subtree may be calculated by using the score calculation formula. When the score of the subtree is calculated by using the above-mentioned score calculation formula, the value of w is the weight between the two connected characters in the character connection pair corresponding to the subtree.

After the scores of the current tree and the subtrees are obtained, it may be determined whether the greatest of the scores of the subtrees is greater than the score of the current tree. When the greatest of the scores of the subtrees is less than the score of the current tree, the characters in the current tree may be used as the characters for training the machine learning model. When the greatest of the scores of the subtrees is greater than the score of the current tree, the subtree with the greatest score may be used as the current tree. Then, each character connection pair in the subtree with the greatest score is pruned, scores of multiple subtrees obtained by pruning the character connection pairs in the current tree are calculated, and then the greatest of the scores of the subtrees is compared with the score of the current tree, until a tree with the highest score among the maximum spanning tree and subtrees in the maximum spanning tree is found.

Step 203, training the convolutional neural network based on bounding boxes corresponding to the selected characters.

In some embodiments, after the characters for training the convolutional neural network are selected from the characters inside the annotation region of the annotated word that are predicted by the convolutional neural network in step 202, bounding boxes corresponding to the selected characters for training the convolutional neural network may be used as label information of a supervised learning mode of the convolutional neural network, the machine learning model is propagated backward according to a preset loss function, the convolutional neural network is trained in the supervised learning mode, and parameters of the convolutional neural network are updated.

In some embodiments, step 201 to step 203 may be performed multiple times to train the convolutional neural network multiple times, so as to obtain a convolutional neural network for detecting characters in images. In each training process, by performing step 201, an image including an annotated word, that is, a word level annotated image, is used as an input to a machine learning model. For example, a word level annotated image in a COCO-Text dataset is used as an input to a convolutional neural network, and is propagated forward by the convolutional neural network. By performing step 202, based on a predicted result of predicted characters inside an annotation region of an annotated word and annotation information of the annotated word, characters suitable for participating in the training of the convolutional neural network are selected from the predicted characters inside the annotation region of the annotated word. The selected characters should satisfy: the corresponding bounding box covers as much as possible the area of the bounding box corresponding to the annotated word and the corresponding bounding box is as collinear as possible with the bounding box corresponding to the annotated word. By performing step 203, bounding boxes corresponding to the selected characters is used as label information of a supervised learning mode of the convolutional neural network, and the convolutional neural network is propagated backward according to a preset loss function, so as to train the convolutional neural network in the supervised learning mode.

In some embodiments, the method for training a convolutional neural network as described in step 201 to step 203 may be applied to a deep convolutional network, SSD, R-FCN, Faster RCNN, or other deep convolutional network frameworks for generic object prediction. Whereby, a convolutional neural network can be fully trained by using existing word level annotated images, for example, word level annotated images in a COCO-Text dataset, to obtain a convolutional neural network capable of detecting characters in images, thereby reducing the costs for the training of a convolutional neural network capable of detecting characters in images. The method is applicable to various different convolutional neural networks. In addition, because the word level annotated images can be used for training without being limited by strict annotation requirements, the number of word level annotated images participating in training is increased, so that the convolutional neural network can be further fully trained.

Figure 3:
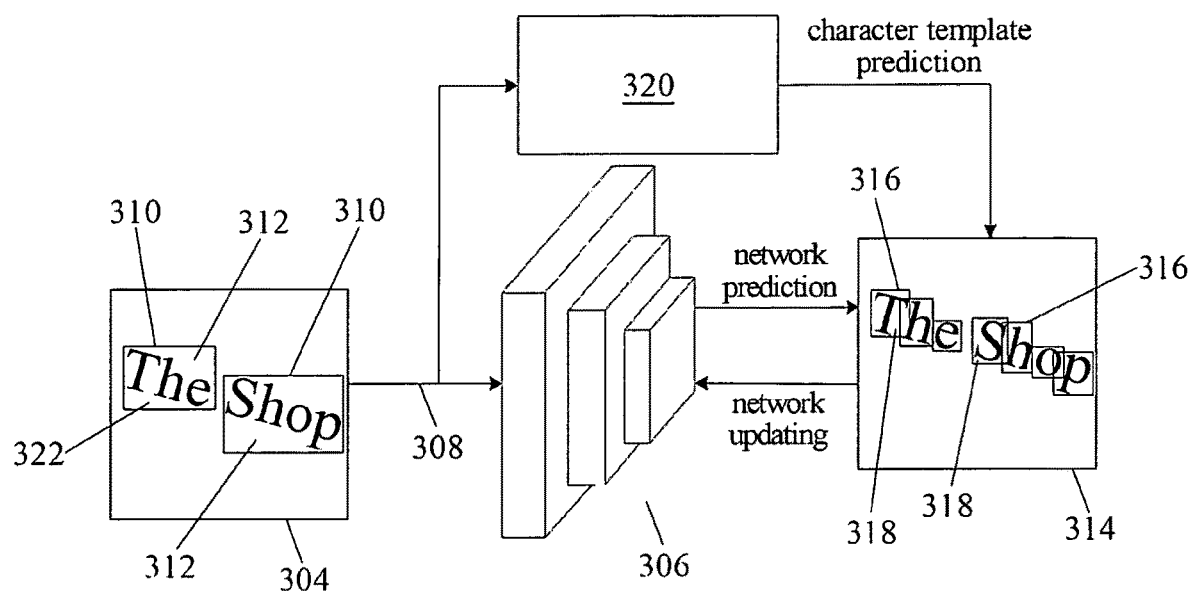
FIG. 3 is a diagram illustrating an architecture suitable for the character detection method of some embodiments of the present disclosure.

Referring to FIG. 3, FIG. 3 is a diagram illustrating an architecture suitable for the character detection method of the present disclosure.

Word level annotated image 304: which is used as an input 308 to a convolutional neural network 306, and may include an annotation box 310 and an annotated word 312 inside the annotation box. Annotation information of the annotated word is the annotation box. The annotation box may be of any shape such as a polygon, and is used for surrounding a word in the image and annotating the position of the word. A word level annotated image in a word level annotated dataset, for example, a COCO-Text dataset, as an input to a deep convolutional network.

Convolutional neural network 306: which receives the inputted word level annotated image 304, and outputs a predicted result 314. The predicted result 314 includes: bounding boxes 316 corresponding to the characters 318 and confidence levels corresponding to the characters. The convolutional neural network 306 may include, but not limited to, a deep convolutional network, single shot multibox detector (SSD), Object Detection via Region-based Fully Convolutional Networks (R-FCN), Faster RCNN, or other deep convolutional network frameworks for generic object prediction.

Character template updating apparatus 320: which, in each training process, simultaneously receives the predicted result 314 of the convolutional neural network 306 and word level annotation information of the word level annotated image 304, that is, the annotation box 310; selects characters suitable for participating in the training of the machine learning model from predicted characters inside the annotation region 322 of the annotated word, based on the predicted result 314 of the convolutional neural network 306 and the word level annotation information of the word level annotated image 304; combines bounding boxes 316 corresponding to the selected characters 318 to obtain an updated character template. The updated character template may be used as label information corresponding to backward propagation of the convolutional neural network in the current training process. The character template updating apparatus frees the entire training process of the convolutional neural network for detecting characters from high-cost character-level annotation information, and allows the use of more text datasets to train the convolutional neural network.

When each training process begins, a word level annotated image is input to the convolutional neural network. The convolutional neural network completes one forward propagation, performs network prediction, and outputs a predicted result of predicted characters. Then, the character template updating apparatus outputs an updated character template that includes the bounding boxes corresponding to the selected characters for training the convolutional neural network, based on the predicted result outputted by the convolutional neural network and the word level annotation information. Finally, the convolutional neural network uses the updated character template as a supervised learning label, completes one backward propagation of the network according to a predefined loss function, performs network updating, that is, updates parameters of the convolutional neural network, and completing training of the convolutional neural network once.

During training of the convolutional neural network, because the convolutional neural network can be fully trained by using only the word level annotation information, that is, the annotation box, and does not rely on annotation information that is accurate to the character level, for example, annotation information corresponding to each character in the annotation box, more text datasets, particularly datasets including only word level annotation information, for example, a COCO-Text dataset, can be used for training. Further, because the word level annotated images can be used for training without being limited by strict annotation requirements, the number of word level annotated images participating in training is increased, so that the convolutional neural network can be further fully trained.

Figure 4:
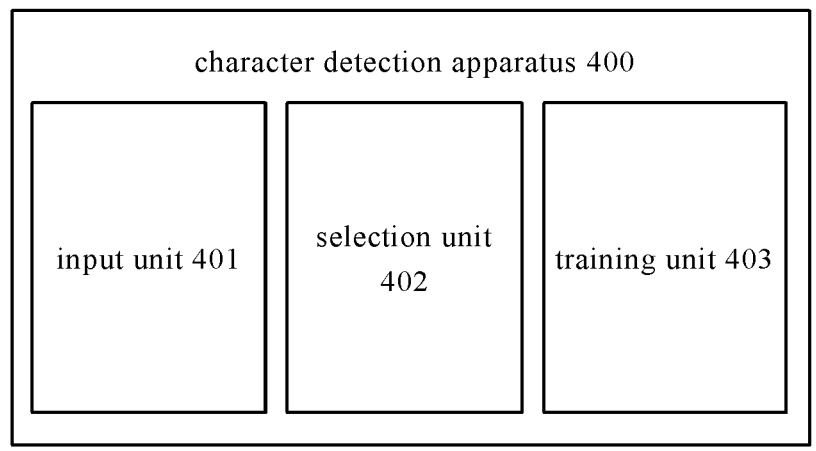
FIG. 4 is a schematic structural diagram of a character detection apparatus according to some embodiments of the present disclosure.

Referring to FIG. 4, FIG. 4 is a schematic structural diagram of a character detection apparatus according to some embodiments of the present disclosure. This apparatus embodiment corresponds to the method embodiment shown in FIG. 1.

As shown in FIG. 4, the character detection apparatus 400 of some embodiments includes: an input unit 401, a selection unit 402, and a training unit 403. The input unit 401 is configured to use an image including an annotated word as an input to a machine learning model. The selection unit 402 is configured to select, based on a predicted result of characters inside an annotation region of the annotated word that are predicted by the machine learning model and annotation information of the annotated word, characters for training the machine learning model from the characters inside the annotation region of the annotated word that are predicted by the machine learning model. The training unit 403 is configured to train the machine learning model based on features of the selected characters, and detect characters in an image by using the trained the machine learning model.

In some optional implementations of some embodiments, the machine learning model is a convolutional neural network.

In some optional implementations of some embodiments, the predicted result includes: bounding boxes corresponding to the characters and confidence levels corresponding to the characters, and the annotation information includes: abounding box corresponding to the annotated word.

In some optional implementations of some embodiments, the predicted result is obtained by propagating forward the machine learning model after the image including the annotated word is used as the input to the machine learning model.

In some optional implementations of some embodiments, the training unit 403 includes: a supervised learning subunit (not shown), configured to use bounding boxes corresponding to the selected characters as label information of a supervised learning mode of the machine learning model; and propagate backward the machine learning model according to a preset loss function to update parameters of the machine learning model.

In some optional implementations of some embodiments, the selection unit 402 includes: a character selection unit (not shown), configured to select the characters for training the machine learning model from the characters inside the annotation region of the annotated word that are predicted by the machine learning model, based on a proportional relationship between a region of the bounding boxes corresponding to the characters inside the annotation region of the annotated word that are predicted by the machine learning model and a region of the bounding box corresponding to the annotated word and an alignment between the characters inside the annotation region of the annotated word that are predicted by the machine learning model.

In some optional implementations of some embodiments, the character selection unit is further configured to: calculate k neighbors for the bounding boxes corresponding to the characters inside the annotation region of the annotated word that are predicted by the machine learning model, to obtain a connection relationship between the characters, where each of the characters is connected to k other characters; calculating a weight $w_{ij}$ between two connected characters by using the following formula:

$$w_{ij} = \exp\left(-\frac{d(i,j)}{\bar{d}}\right) \cdot (t_i + t_j)$$

where two connected characters constitute one character connection pair, d(i, j) represents a distance between the two connected characters, $\bar{d}$ represents an average distance between characters in all character connection pairs, and $t_i$ and $t_j$ represent respective confidence levels corresponding to the two connected characters; finding a maximum spanning tree, where the maximum spanning tree includes sequentially connected characters that are predicted by the machine learning model, and the sum of the weights between the characters is the greatest; executing the following selection operation: pruning each character connection pair in a current tree to obtain multiple subtrees, where when the selection operation is executed for the first time, the current tree is the maximum spanning tree; calculating a score s of a subtree or the current tree by using the following formula:

$$s = w \cdot s1 + (1-w) \cdot s2$$

$$s1 = \frac{\text{area}(B_{chars})}{\text{area}(B_{anno})}$$

$$s2 = 1 - \frac{\lambda_2}{\lambda_1}$$

where $B_{chars}$ represents a bounding box corresponding to a character in the subtree or the current tree, $B_{anno}$ represents the bounding box corresponding to the annotated word, area($B_{chars}$) represents the area of the bounding boxes corresponding to the characters in the subtree or the current tree, area($B_{anno}$) represents the area of the bounding box corresponding to the annotated word, $\lambda_1$ and $\lambda_2$ respectively represent the greatest feature value and the second greatest feature value of a covariance matrix of the center coordinates of $B_{chars}$, w is a preset weight when the selection operation is executed for the first time, and w is the weight between the two characters in the character connection pair corresponding to the subtree when the selection operation is not executed for the first time;

determining whether the greatest of the scores of the subtrees is greater than the score of the current tree; and if yes, using the subtree with the greatest score as the current tree, and executing the selection operation again; or if not, using the characters in the current tree as the characters for training the machine learning model.

In some optional implementations of some embodiments, the apparatus 400 further includes: an annotation information acquiring unit (not shown), configured to use a word level annotated image in a word level annotated dataset as the image including the annotated word, where the word level annotated image includes: an annotation box surrounding the word, for annotating the position of the word.

Figure 5:
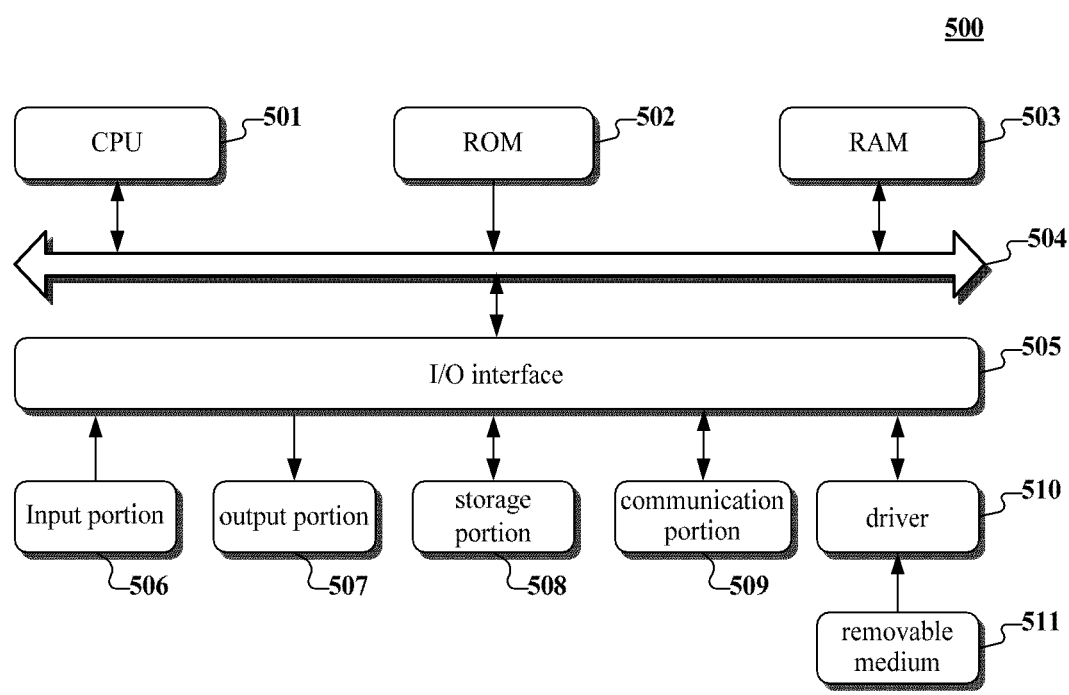
FIG. 5 is a schematic structural diagram of a computer system adapted to implement a character detection apparatus according to some embodiments of the present disclosure.

Referring to FIG. 5, a schematic structural diagram of a computer system 500 adapted to implement a computer system for detecting characters according to some embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to some embodiments of the present disclosure, the process described above with reference to the flow chart may be implemented in a computer software program. For example, some embodiments of the present disclosure includes a computer program product, which comprises a computer program that is tangibly embedded in a machine-readable medium. The computer program comprises program codes for executing the method as illustrated in the flow chart. In such some embodiments, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, some embodiments of the present disclosure further provide a computer readable storage medium. the computer readable storage medium may be the computer readable storage medium included in the apparatus in the above embodiments, or a stand-alone computer readable storage medium which has not been assembled into the apparatus. the computer readable storage medium stores one or more programs. the one or more programs, when executed by a device, cause the device to: use an image comprising including an annotated word as an input to a machine learning model; select, based on a prediction predicted result of for characters inside an annotation region of the annotated termword that are predicted by the machine learning model and annotation information of the annotated termword, characters for training the machine learning model from the characters inside the annotation region of the annotated termword that are predicted by the machine learning model; and train the machine learning model based on features of the selected characters, and detect characters in an image by using the trained machine learning model.

The foregoing is only a description of the embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A character detection method, comprising:
using an image including an annotated word as an input to a machine learning model, comprising: using a word level annotated image in a word level annotated dataset as the image including the annotated word, the word level annotated image comprising an annotation box surrounding the word for annotating the position of the word;
selecting, based on a predicted result for characters being inside an annotation region of the annotated word and predicted by the machine learning model and annotation information of the annotated word, characters for training the machine learning model from the characters being inside the annotation region of the annotated word and predicted by the machine learning model, wherein the predicted result comprises: bounding boxes corresponding to the characters being inside the annotation region of the annotated word and confidence levels corresponding to the characters being inside the annotation region of the annotated word, and the annotation information comprises a bounding box corresponding to the annotated word;
training the machine learning model based on features of the selected characters; and
detecting characters in an image by using the trained machine learning model,
wherein the selecting characters for training the machine learning model from the characters being inside the annotation region of the annotated word and predicted by the machine learning model comprises:
calculating k neighbors for the bounding boxes corresponding to the characters being inside the annotation region of the annotated word and predicted by the machine learning model, to obtain a connection relationship between the characters, wherein each of the characters is connected to k other characters;
calculating a weight $w_{ij}$ between two connected characters by using the following formula:

$$w_{ij} = \exp\left(-\frac{d(i,j)}{\bar{d}}\right) \cdot (t_i + t_j)$$

wherein the two connected characters constitute a character connection pair, $d(i, j)$ represents a distance between the two connected characters, $\bar{d}$ represents an average distance between characters in all character connection pairs, and $t_i$ and $t_j$ represent respective confidence levels corresponding to the two connected characters;
finding a maximum spanning tree, wherein the maximum spanning tree comprises sequentially connected characters predicted by the machine learning model, and the sum of the weights between the characters is the greatest;
executing the following selection operation:
pruning each character connection pair in a current tree to obtain multiple subtrees, wherein when the selection operation is executed for the first time, the current tree is the maximum spanning tree;
calculating a score s of a subtree or the current tree by using the following formula:

$$s = w \cdot s1 + (1-w) \cdot s2$$
$$s1 = \frac{\text{area}(B_{chars})}{\text{area}(B_{anno})}$$
$$s2 = 1 - \frac{\lambda_2}{\lambda_1}$$

wherein $B_{chars}$ represents a bounding box corresponding to a character in the subtree or the current tree, $B_{anno}$ represents the bounding box corresponding to the annotated word, area($B_{chars}$) represents the area of the bounding boxes corresponding to the characters in the subtree or the current tree, area($B_{anno}$) represents the area of the bounding box corresponding to the annotated word, $\lambda_1$ and $\lambda_2$ respectively represent the greatest feature value and the second greatest feature value of a covariance matrix of the center coordinates of $B_{chars}$, w is a preset weight when the selection operation is executed for the first time, and w is the weight between the two characters in the character connection pair corresponding to the subtree when the selection operation is not executed for the first time;
determining whether the greatest of the scores of the subtrees is greater than the score of the current tree; and
if yes, using the subtree with the greatest score as the current tree, and executing the selection operation again; or
if not, using the characters in the current tree as the characters for training the machine learning model.

2. The method according to claim 1, wherein the machine learning model comprises a convolutional neural network.

3. The method according to claim 1, wherein after the using the image including the annotated word as input to the machine learning model, the method further comprises propagating forward the machine learning model to output the predicted result.

4. The method according to claim 3, wherein training the machine learning model based on the features of the selected characters comprises:
using bounding boxes corresponding to the selected characters as label information of a supervised learning mode of the machine learning model; and
propagating backward the machine learning model according to a preset loss function to update parameters of the machine learning model.

5. The method according to claim 1, wherein selecting, based on the predicted result of characters being inside the annotation region of the annotated word and predicted by the machine learning model and the annotation information of the annotated word, characters for training the machine learning model from the characters being inside the annotation region of the annotated word and predicted by the machine learning model comprises:
selecting the characters for training the machine learning model from the characters being inside the annotation region of the annotated word and predicted by the machine learning model, based on a proportional relationship between a region of the bounding boxes corresponding to the characters being inside the annotation region of the annotated word and predicted by the machine learning model and a region of the bounding box corresponding to the annotated word, and an alignment between the characters being inside the annotation region of the annotated word and predicted by the machine learning model.

6. A character detection apparatus, comprising:
at least one processor; and
a memory storing instructions, which when executed by the at least one processor, cause the at least one processor to perform operations, the operations comprising:
using an image including an annotated word as an input to a machine learning model, comprising: using a word level annotated image in a word level annotated dataset as the image including the annotated word, the word level annotated image comprising an annotation box surrounding the word for annotating the position of the word;
selecting, based on a predicted result of characters being inside an annotation region of the annotated word and predicted by the machine learning model and annotation information of the annotated word, characters for training the machine learning model from the characters being inside the annotation region of the annotated word and predicted by the machine learning model, wherein the predicted result comprises: bounding boxes corresponding to the characters being inside the annotation region of the annotated word and confidence levels corresponding to the characters being inside the annotation region of the annotated word, and the annotation information comprises a bounding box corresponding to the annotated word; and
training the machine learning model based on features of the selected characters, and detecting characters in an image by using the trained machine learning model,
wherein the selecting characters for training the machine learning model from the characters being inside the annotation region of the annotated word and predicted by the machine learning model comprises:
calculating k neighbors for the bounding boxes corresponding to the characters being inside the annotation region of the annotated word and predicted by the machine learning model, to obtain a connection relationship between the characters, wherein each of the characters is connected to k other characters;
calculating a weight $w_{ij}$ between two connected characters by using the following formula:

$$w_{ij} = \exp\left(-\frac{d(i,j)}{\bar{d}}\right) \cdot (t_i + t_j)$$

wherein the two connected characters constitute a character connection pair, $d(i, j)$ represents a distance between the two connected characters, $\bar{d}$ represents an average distance between characters in all character connection pairs, and $t_i$ and $t_j$ represent respective confidence levels corresponding to the two connected characters;
finding a maximum spanning tree, wherein the maximum spanning tree comprises sequentially connected characters predicted by the machine learning model, and the sum of the weights between the characters is the greatest;
executing the following selection operation:
pruning each character connection pair in a current tree to obtain multiple subtrees, wherein when the selection operation is executed for the first time, the current tree is the maximum spanning tree;
calculating a score s of a subtree or the current tree by using the following formula:

$$s = w \cdot s1 + (1 - w) \cdot s2$$

$$s1 = \frac{\text{area}(B_{chars})}{\text{area}(B_{anno})}$$

$$s2 = 1 - \frac{\lambda_2}{\lambda_1}$$

wherein $B_{chars}$ represents a bounding box corresponding to a character in the subtree or the current tree, $B_{anno}$ represents the bounding box corresponding to the annotated word, area($B_{chars}$) represents the area of the bounding boxes corresponding to the characters in the subtree or the current tree, area($B_{anno}$) represents the area of the bounding box corresponding to the annotated word, $\lambda_1$ and $\lambda_2$ respectively represent the greatest feature value and the second greatest feature value of a covariance matrix of the center coordinates of $B_{chars}$, w is a preset weight when the selection operation is executed for the first time, and w is the weight between the two characters in the character connection pair corresponding to the subtree when the selection operation is not executed for the first time;
determining whether the greatest of the scores of the subtrees is greater than the score of the current tree; and
if yes, using the subtree with the greatest score as the current tree, and executing the selection operation again; or
if not, using the characters in the current tree as the characters for training the machine learning model.

7. The apparatus according to claim 6, wherein the machine learning model comprises a convolutional neural network.

8. The apparatus according to claim 6, wherein the predicted result is obtained by propagating forward the machine learning model after the image including the annotated word is used as the input to the machine learning model.

9. The apparatus according to claim 8, wherein training the machine learning model based on the features of the selected characters comprises:
using bounding boxes corresponding to the selected characters as label information of a supervised learning mode of the machine learning model; and
propagating backward the machine learning model according to a preset loss function to update parameters of the machine learning model.

10. The apparatus according to claim 6, wherein selecting, based on the predicted result of characters being inside the annotation region of the annotated word and predicted by the machine learning model and the annotation information of the annotated word, characters for training the machine learning model from the characters being inside the annotation region of the annotated word and predicted by the machine learning model comprises:

selecting the characters for training the machine learning model from the characters being inside the annotation region of the annotated word and predicted by the machine learning model, based on a proportional relationship between a region of the bounding boxes corresponding to the characters being inside the annotation region of the annotated word and predicted by the machine learning model and a region of the bounding box corresponding to the annotated word and an alignment between the characters being inside the annotation region of the annotated word and predicted by the machine learning model.

11. A non-transitory computer storage medium storing a computer program, which when executed by one or more processors, causes the one or more processors to perform operations, the operations comprising:

using an image including an annotated word as input to a machine learning model comprising: using a word level annotated image in a word level annotated dataset as the image including the annotated word, the word level annotated image comprising an annotation box surrounding the word for annotating the position of the word;

selecting, based on a predicted result for characters being inside an annotation region of the annotated word and predicted by the machine learning model and annotation information of the annotated word, characters for training the machine learning model from the characters being inside the annotation region of the annotated word and predicted by the machine learning model, wherein the predicted result comprises: bounding boxes corresponding to the characters being inside the annotation region of the annotated word and confidence levels corresponding to the characters being inside the annotation region of the annotated word, and the annotation information comprises a bounding box corresponding to the annotated word; and training the machine learning model based on features of the selected characters, and detecting characters in the image by using the trained machine learning model, wherein the selecting characters for training the machine learning model from the characters being inside the annotation region of the annotated word and predicted by the machine learning model comprises:

calculating k neighbors for the bounding boxes corresponding to the characters being inside the annotation region of the annotated word and predicted by the machine learning model, to obtain a connection relationship between the characters, wherein each of the characters is connected to k other characters;

calculating a weight $w_{ij}$ between two connected characters by using the following formula:

$$w_{ij} = \exp\left(-\frac{d(i,j)}{\bar{d}}\right) \cdot (t_i + t_j)$$

wherein the two connected characters constitute a character connection pair, d(i, j) represents a distance between the two connected characters, $\bar{d}$ represents an average distance between characters in all character connection pairs, and $t_i$ and $t_j$ represent respective confidence levels corresponding to the two connected characters;

finding a maximum spanning tree, wherein the maximum spanning tree comprises sequentially connected characters predicted by the machine learning model, and the sum of the weights between the characters is the greatest;

executing the following selection operation:

pruning each character connection pair in a current tree to obtain multiple subtrees, wherein when the selection operation is executed for the first time, the current tree is the maximum spanning tree;

calculating a score s of a subtree or the current tree by using the following formula:

$$s = w \cdot s1 + (1-w) \cdot s2$$

$$s1 = \frac{\text{area}(B_{chars})}{\text{area}(B_{anno})}$$

$$s2 = 1 - \frac{\lambda_2}{\lambda_1}$$

wherein $B_{chars}$ represents a bounding box corresponding to a character in the subtree or the current tree, $B_{anno}$ represents the bounding box corresponding to the annotated word, area($B_{chars}$) represents the area of the bounding boxes corresponding to the characters in the subtree or the current tree, area($B_{anno}$) represents the area of the bounding box corresponding to the annotated word, $\lambda_1$ and $\lambda_2$ respectively represent the greatest feature value and the second greatest feature value of a covariance matrix of the center coordinates of $B_{chars}$, w is a preset weight when the selection operation is executed for the first time, and w is the weight between the two characters in the character connection pair corresponding to the subtree when the selection operation is not executed for the first time;

determining whether the greatest of the scores of the subtrees is greater than the score of the current tree; and if yes, using the subtree with the greatest score as the current tree, and executing the selection operation again; or if not, using the characters in the current tree as the characters for training the machine learning model.

12. The non-transitory computer storage medium according to claim 11, wherein the machine learning model comprises a convolutional neural network.

13. The non-transitory computer storage medium according to claim 11, wherein after using the image including the annotated word as input to the machine learning model, the operations further comprise:

propagating forward the machine learning model to output the predicted result.

* * * * *